Oct. 3, 1961　　　　J. C. STEINBERG　　　　3,002,483
DEPTH CONTROL DEVICE
Filed Nov. 24, 1947
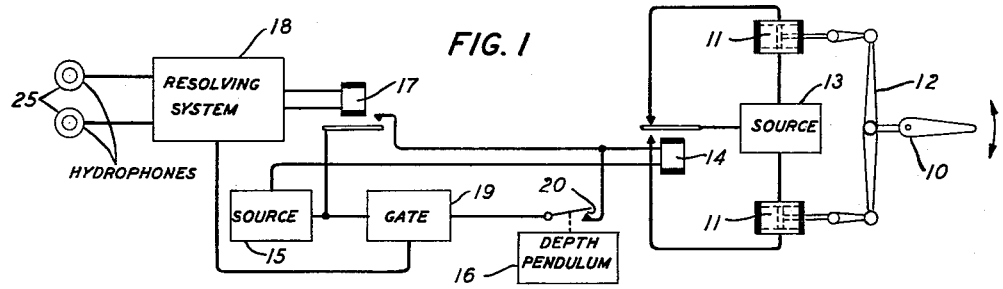
FIG. 1
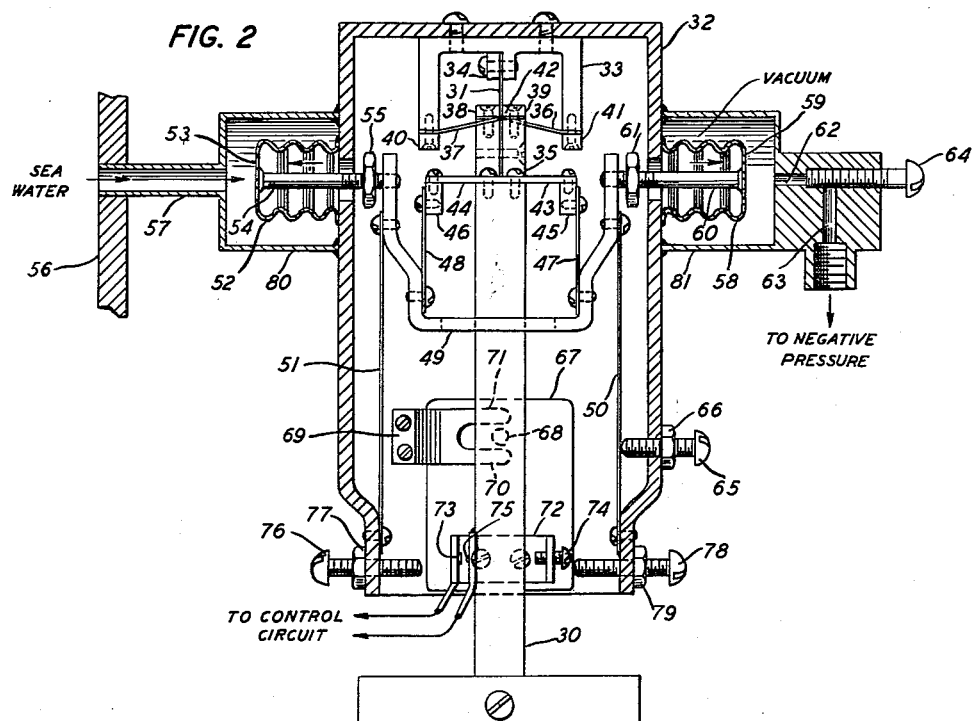
FIG. 2
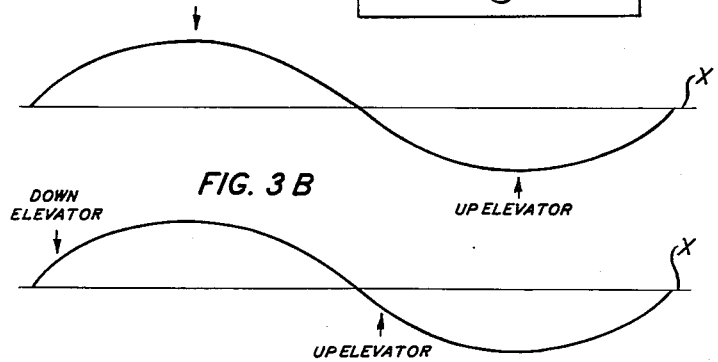
FIG. 3A
FIG. 3B
INVENTOR
J.C. STEINBERG
BY
ATTORNEY / 3,002,483
DEPTH CONTROL DEVICE
John C. Steinberg, Short Hills, N.J., assignor to Bell Telephone Laboratories, Incorporated, New York, N.Y., a corporation of New York
Filed Nov. 24, 1947, Ser. No. 787,841
5 Claims. (Cl. 114—25)

This invention relates to torpedo control units and more particularly to depth-pendulum units for controlling the elevator in sonically guided torpedoes such as disclosed, for example, in the application Serial No. 564,340, filed November 20, 1944 of Harold C. Montgomery and John C. Steinberg.

The control unit of this invention is an improvement on the control unit disclosed in the application Serial No. 731,517, filed February 28, 1947 of Harold C. Montgomery, and is particularly adapted to use in small torpedoes.

Control units of the type to which this invention pertains comprise, in general, a pendulum, contacts controlled thereby, and a bellows or similar element coupled to the pendulum and actuated in accordance with the hydrostatic pressure upon or at the torpedo. The contacts are included in a control circuit for the elevator. The pendulum, bellows and contacts are cooperatively associated to control the elevator in such manner as to tend to maintain the torpedo level and at a preassigned running depth, the control being effected by opening and closing the contacts.

When proceeding under depth and pendulum control, the torpedo follows a substantially sinusoidal path in the vertical dimension, i.e., it oscillates about the preassigned running depth. Such oscillatory motion represents an increase in the length of path followed by the torpedo and, hence, a loss of range. Under these conditions, the torpedo elevator control circuit functions by the on-off action of the pendulum contact; that is, if the contact is closed, the elevators of the torpedo are hard over in one direction and if the contact is open, the elevators are hard over in the opposite direction. With the conventional pendulum-bellows control unit, the torpedo sinusoidal path will have a definite frequency and amplitude for a given set of conditions.

In the control unit disclosed in copending application Serial No. 731,517, the contact moves with the pendulum so that the torpedo need not return to zero tilt to open or close the contact. If the stops on its pendulum are adjusted to permit the pendulum to swing through the full tilt angle of the torpedo but the contact lags the pendulum only a small fraction of this angle, the points of opening and closing of the contact will be shifted. This will result in an increase of frequency of tilt and reduction of both tilt angle and depth excursions of the torpedo. This type of torpedo control is satisfactory for torpedoes operating under depth-pendulum control when launched near their operating depths or when launched below their operating depths provided their vertical turning radius is sufficiently large.

Torpedoes are often launched at depths considerably below their preassigned running depth. In this case, the force exerted by the hydrostatic bellows on the pendulum may exceed the force exerted by gravity for any angle of tilt and hence result in up elevator for a sufficient length of time to cause the torpedo to assume vertical angles of climb and may result in undesirable perturbations and broaching. This is particularly true for small torpedoes having a relatively short turning radius.

The internal atmospheric pressure in torpedoes stored in a submarine may vary considerably from time to time due to variation in depth of submersion of the submarine. Variations of internal pressure also occur due to internal temperature changes. In the conventional depth-pendulum control units, the hydrostatic bellows operates against the internal pressure in the torpedoes and is calibrated to operate at about a given running depth for a certain internal pressure. If the internal pressure in the torpedo changes, its running depth will be changed thereby.

One object of this invention is to limit the maximum dive and climb angles that torpedoes can assume when operating under depth-pendulum control at some depth other than their normal running depth. This is particularly important for small torpedoes having a relatively short turning radius, to prevent broaching and other undesirable perturbations.

Another object of this invention is to maintain the running depth of a torpedo substantially constant at a preassigned magnitude.

One feature of this invention relates to a compliant coupling which connects the bellows to the pendulum and serves to limit the maximum force that the bellows can apply to the pendulum irrespective of departure of the torpedo from normal running depth.

Another feature of this invention relates to the provision of a stop on the bellows which serves to limit the maximum displacement of the bellows and hence the force that it can apply to the pendulum through the compliant coupling. The maximum force can be predetermined in the design of the coupling to correspond to a desired tilt angle of the torpedo.

A further feature of this invention relates to a vacuum bellows which is arranged to counterbalance the effect upon the hydrostatic bellows of changes in the atmospheric pressure and temperature within the torpedo.

A still further feature relates to limitation of the angle of swing of the pendulum so that the pendulum is free to swing through angles corresponding to oscillations of the torpedo without the introduced phase shift.

The invention and the above-noted and other features will be understood more clearly and fully from the following detailed description with reference to the accompanying drawing in which:

FIG. 1 is a circuit diagram, mainly in block form, of an elevator control system illustrative of one embodiment of this invention;

FIG. 2 is an elevational view, partly in section, of a depth-pendulum control unit constructed in accordance with this invention; and FIGS. 3A and 3B are diagrams which will be referred to hereinafter in explaining the operation of the control unit illustrated in FIG. 2.

Referring now to the drawing, the control system illustrated in FIG. 1 comprises elevator 10 which is deflectable in opposite directions, i.e. up or down, by solenoids 11 to the cores of which it is coupled by linkage 12, the direction of deflection being determined by which of the solenoids is energized by the source 13. The energizing circuit for each of the solenoids is obvious and is traced from source 13 over the armature and one or the other of transfer contacts of a relay 14.

The relay 14 is energized from source 15 over either of two circuits, one of which is controlled by depth-pendulum unit 16 and the other of which is controlled by an auxiliary relay 17. The relay 17 is controlled, in turn, by a resolving system which is energized by hydrophones 25 mounted one above and the other below the longitudinal axis of the torpedo so that the relative output of the two hydrophones is determined by a direction relative to the torpedo of the source, such as a target vessel, from which underwater signals received by the hydrophones emanate. The system 18 converts signals received by hydrophones 25 into a control signal effective to cause operation or release of the relay 17 depending on whether the torpedo is headed above or below the target vessel.

The circuit controlled by the depth-pendulum unit 16 includes a gate 19 which is operated from the resolving system 18 to open this circuit when the signals received by the hydrophones 25 are of a prescribed character. The gate may be, for example, of the amplitude type which operates when the underwater signals received by the hydrophones reach a preassigned level. Alternatively, it may be of the differential type, such as disclosed in the application Serial No. 564,340, filed November 20, 1944, of Harold C. Montgomery and John C. Steinberg, which operates when the difference between the outputs of the two hydrophones reaches a preassigned magnitude. The depth-pendulum unit 16 controls the relay 14 by opening or closing contact 20 in accordance with the direction of departure of the torpedo from level position at a prescribed runnin depth, whereby the elevator 10 is deflected accordingly to tend to maintain the torpedo level at this depth.

The general operation of the system thus far described is as follows: Immediately after launching, the torpedo proceeds with the relay 14 and, hence, the elevator 10 under control of the depth-pendulum unit 16. When the signals received from the target vessel are such that gate 19 operates, the depth-pendulum unit is dissociated from relay 14 and the latter, thus, is placed under control of the relay 17 so that the elevator is controlled thereafter in accordance with target signals to steer the torpedo, in the vertical dimension, to the target.

When the torpedo is proceeding with the elevator under control of the depth-pendulum unit 16, it oscillates substantially sinusoidally about the prescribed running depth. The general form of the torpedo path in the vertical dimension is illustrated by the curves of FIGS 3A and 3B, the prescribed running depth being indicated in the figures by the line X. It is eminently desirable, of course, that both the amplitude and period of oscillation be small. In accordance with features of this invention, a very small amplitude and rapid oscillation are realized by constructing the depth-pendulum unit so that, in effect, the unit hastens the application of elevator correction.

In one construction illustrative of this invention and shown in FIG. 2, the depth-pendulum comprises a pendulum 30 suspended by flat spring 31 attached to fixed support 32 which is mounted in the torpedo so that the pendulum 30 is vertical when the torpedo is level and can swing fore and aft in a vertical plane including the longitudinal axis of the torpedo. Spring 31 is clamped to yoke 33 on support 32 by plate 34. Pendulum 30 is clamped to spring 31 by plate 35. Flat springs 36, 37 are clamped to the top of pendulum 30 by plates 38, 39 and to yoke 33 by plates 40, 41. Springs 36, 37 cause point 42 to be a frictionless pivot point for pendulum 30.

Pendulum 30 supports two links 43, 44 rigidly attached thereto by screws. The outer end of link 43 is rigidly attached to plate 45 by screws and the outer end of link 44 is rigidly attached to plate 46 by screws. Spring 47 extending downward is attached to plate 45 by screws and spring 48 extending downward is attached to plate 46 by screws. A yoke 49 is attached to the bottom ends of springs 47, 48 by means of screws. Yoke 49 is flexibly coupled to support 32 by two flat springs 50, 51 which are attached to yoke 49 and support 32 by screws. Tension may be applied to spring 50 by an adjustable screw 65 threaded through support 32 and locked by nut 66.

Bellows 52 is enclosed in a housing 80 rigidly attached to one side of support 32. Movable face 53 of bellows 52 is coupled to yoke 49 by piston 54 which carries an adjustable stop nut 55 on a threaded portion thereof. The exterior of bellows 52 connects to the surface 56 of the torpedo through a tube 57 to permit entry of sea water into the housing 80.

Bellows 58 is enclosed in an evacuated housing 81 rigidly attached to the opposite side of support 32 in juxtaposition to bellows 52 and its movable face 59 is coupled to yoke 49 by piston 60 which carries an adjustable stop nut 61 on a threaded portion thereof. Housing 81 is arranged for connection to a source of negative pressure through openings 62, 63 which form a passage which can be tightly closed by screw 64. By "negative pressure," here and in the showing of FIG. 2, is meant a pressure lower than atmospheric.

Support 32 has openings surrounding pistons 54, 60 to permit the air pressure existing within the torpedo to act on the movable faces 53, 59 of bellows 52, 58 respectively. Bellows 52 is substantially equal in size to bellows 58. Consequently the air pressure within the torpedo exerts substantially equal and opposing forces on bellows faces 53, 59 which substantially neutralizes the effect on bellows 52 of variations in air pressure within the torpedo.

A flat plate 67 of insulating material, such as a phenolic condensation product, is pivoted and rockable on pintle 68 which is rigidly attached to mounting 32. Spring 69 is attached to mounting 32 by screws and is shaped with two pronged ends 70, 71 bearing upon plate 67 for applying pressure thereto as frictional means to restrain the rocking motion of plate 67.

Plate 67 supports a contact member 72 rigidly attached thereto by screws. One end of contact member 72 is formed normal to the body thereof and carries a contact point 73 for inclusion in the control circuit of the torpedo. The opposite end of member 72 is also formed normal to the body thereof and carries an adjustable screw contact 74. Contact point 73 is for making contact with contact point 75 which is carried by pendulum 30. Contact point 75 is also included in the elevator control circuit of the torpedo. Contact 74 performs no electrical function but is arranged to be struck by pendulum 30 when pendulum 30 swings to the right. Contact point 75 is arranged to strike contact point 73 when pendulum 30 swings to the left, which action closes the energizing circuit for the relay 14 in FIG. 1.

An adjustable screw 76 with a lock nut 77 is threaded through the lower portion of the left side of mounting 32. An adjustable screw 78 with a lock nut 79 is threaded through the lower portion of the right side of mounting 32. Screws 76, 78 act as stops to limit the movement of plate 67 on pintle 68.

The desired running depth for the torpedo is established before launching by making suitable adjustments in the control unit which include a definite negative pressure on bellows 58, a definite adjustment of screw 65, and suitable location of stop nuts 55, 61.

In the device of this invention, when the torpedo is level and at the normal running depth for which it is adjusted, the bellows face 53 is substantially mid-way in its permissible travel and there is no force on coupling springs 47, 48. Consequently the force of the sea water on the bellows face 53 and the force of the negative pressure on face 59 of bellows 58 are exactly balanced by the tension exerted on spring 50 by adjustment screw 65. As stated hereinbefore, air pressure within the torpedo exerts equal and opposite forces upon faces 53, 59 of bellows 52, 58 respectively resulting in no effect upon the operation of the control unit by reason of changes in internal air pressure within the torpedo, whereby a substantially constant running depth is maintained.

Plate 67 is pivotally mounted and spring 69 provides sufficient friction so that plate 67 will remain at any position to which it is deflected or swung. It will be noted that when pendulum 30 swings to the left in FIG. 2, the contact point 75 is forced against contact point 73. Then when pendulum 30 begins to swing to the right, contact point 75 is immediately disengaged from contact point 73. Plate 67 remains in the position to which it had been moved until pendulum 30 engages contact screw 74, whereupon plate 67 is moved to the right as a result of the swing pendulum 30 in this direction. Consequently both contact points 73 and 75 move to the right. If, then, pendulum 30 again swings to the left the contact point 75 almost immediately engages contact point 73.

The effect of plate 67 and its detachable association with pendulum 30 is to introduce a leading phase, of or approaching 90 degrees, in the operation of contact points 73 and 75. This will be seen from the following considerations. Assume that the contact point 75 was fixed with pendulum 30 at the mid-position of the pendulum swing, that engagement of contact point 75 with contact point 73 results in down elevator and disengagement of these contacts from one another results in up elevator. For these conditions, the opening or closing of the contacts would occur as the tilt angle of the torpedo went through zero as shown in FIG. 3A. That is to say, the contacts would remain disengaged for the time that the pendulum swung from the vertical, to the right and back to vertical and would remain engaged for the balance of each cycle.

In the construction illustrated in FIG. 2, however, as has been pointed out hereinbefore, immediately after the pendulum has swung to the right and begun to return to vertical, the contact points 73 and 75 engage. Similarly, immediately after the pendulum has swung to the left and begun to return to the vertical, the contact points disengage. Thus, in both cases, the control of the elevator as a result of engagement or disengagement of the contact points occurs at substantially the beginning of the swing of the pendulum to the left or to the right as the case may be. Thus, in effect, a 90-degree leading phase shift in the operation of the contact points is provided as shown in FIG. 3B. As a result, the amplitude of the oscillations of the torpedo about the prescribed running depth, while the elevator is under the control of the pendulum unit, is substantially reduced and the frequency of oscillation is increased.

Compliant coupling springs 47, 48 and stop nuts 55, 61 place a limit on the force that can be applied to pendulum 30 by bellows 52. Assume that the torpedo has been launched from a depth that is considerably greater than the preassigned running depth of the torpedo. Sea water will immediately enter housing 80 and hydrostatic pressure therefrom will exert a pressure on face 53 of the bellows 52. This pressure will be transferred to yoke 49 by piston 54. Yoke 49 will move to the right as a result and this movement will move the lower ends of compliant springs 47, 48 to the right. This will put tension on the upper ends of springs 47, 48 which will press links 43, 44 toward the right. The force on links 43, 44, which are rigidly attached to pendulum 30, will cause the pendulum to swing to the right to hold open the control circuit contacts which will cause up elevator. The resulting tilt upward of the torpedo will increase the gravitational force on pendulum 30 in a direction to swing the pendulum to the left. When this effect has increased sufficiently by reason of increase of tilt angle of the torpedo, the contact points 73 and 75 will engage and cause down elevator. The torpedo tilt will be reduced thereby and when the pendulum force to the left is reduced by a sufficient amount the pendulum will swing to the right and contact point 75 will disengage contact point 73 and up elevator will again result. Stop nuts 55 and 61 are adjusted on pistons 54 and 60 respectively so that when the hydrostatic pressure on bellows 52 exceeds a desired amount, stop nut 61 will strike mounting 32 and limit the displacement of yoke 49 toward the right. Decrease in hydrostatic pressure below a desired minimum will cause stop nut 55 to strike mounting 32 to limit the displacement that bellows 52 can produce on yoke 49 toward the left. The limitation of the displacement of yoke 49, limits the force that it can exert on pendulum 30 through the compliant couplings 47 and 48. The compliance of springs 47 and 48 determines the maximum force which the bellows can produce in opposition to the pendulum. Thus, the pendulum can override the bellows force provided that the departure of the pendulum from vertical is at least a certain angle. The compliance of the springs may be predetermined to fix this angle whereby the maximum dive and climb angles for the torpedo are preset. The limitation of the force that can be applied by bellows 52 to pendulum 30 thereby limits the angle of climb or drive of the torpedo.

Although a specific embodiment of the invention has been shown and described, it will be understood that it is but illustrative and that various modifications may be made therein without departing from the scope and spirit of this invention as defined in the appended claims.

What is claimed is:

1. In an elevator control system for a torpedo comprising an elevator, actuating means for said elevator and a control circuit for said actuating means for effecting deflection of the elevator in one or the opposite direction in accordance with whether the control circuit is open or closed, depth-tilt control means mounted in the torpedo including a first control means to control a pair of contacts for inclusion in said control circuit to open and close said control circuit in accordance with the direction of departure of the torpedo from level position, a second control means to alter the movement of said first control means by a limited amount in opening and closing of said contacts dependent upon the extent of departure of the torpedo from preassigned depth, a third control means to counterbalance the effect on said second control means of change in pressure in the torpedo, one of said contacts being coupled to said first control means and movable therewith, and compliant coupling means between said first and second control means.

2. In an elevator control system for a torpedo comprising an elevator, actuating means for said elevator and a control circuit for said actuating means for effecting deflection of the elevator in one or the opposite direction in accordance with whether the control circuit is open or closed, a depth-tilt control unit comprising a pendulum mounted in the torpedo to swing in accordance with departure of the torpedo from level position, a first bellows mounted in the torpedo and arranged to expand or contract by a limited amount in accordance with the extent and direction of departure of the torpedo from preassigned depth, a second bellows mounted in the torpedo and arranged to expand or contract in accordance with change in the pressure within the torpedo to counterbalance expansion or contraction of said first bellows due to such changes in atmospheric pressure in the torpedo, a pair of contacts for inclusion in said circuit, one of said contacts being coupled to said pendulum and movable therewith, and a compliant coupling between said pendulum and said first and second bellows.

3. In an elevator control system for a torpedo comprising an elevator, actuating means for said elevator and a control circuit for said actuating means for effecting deflection of the elevator in one or the opposite direction in accordance with whether the control circuit is open or closed, a depth-tilt control unit comprising a pendulum mounted in the torpedo to swing in accordance with departure of the torpedo from level position, pressure responsive control means compliantly coupled to said pendulum for altering the movement of said pendulum in accordance with the extent and direction of departure of the torpedo from preassigned depth, means attached to said control means for counterbalancing the effect upon said control means of changes in pressure in the torpedo and means under the control of said pendulum for opening said control circuit when said pendulum tilts in one direction and closing said control circuit when said pendulum tilts in the opposite direction.

4. A depth-tilt control unit for a torpedo, comprising a mounting for attachment in a torpedo, a spring suspended pendulum supported on said mounting to swing in a vertical plane extending lengthwise of the torpedo, in accordance with departure of the torpedo from level position, a yoke positioned adjacent the pivot point of said pendulum and flexibly attached to said mounting for reciprocal rectilinear movement substantially horizontally in a vertical plane parallel to the plane of movement of said pendulum, said yoke being compliantly coupled to said pendulum at a point below said pivot point of said pendulum, a first bellows rigidly attached to said mounting with its movable face rigidly attached to said yoke for applying force substantially horizontally to said yoke in accordance with changes of pressure on said first bellows, an adjustable stop to limit expansion or contraction of said first bellows, a tube for connecting a surface of said first bellows to the exterior of the torpedo, a second bellows rigidly attached to said mounting with its movable face rigidly attached to said yoke positioned on the opposite side of said yoke in juxtaposition to said first bellows for applying force substantially horizontally to said yoke in accordance with changes of pressure on said second bellows, a movable member rockable in a vertical plane of movement parallel to the plane of movement of said pendulum and frictionally pivoted on said mounting at a point near the middle of said pendulum on a pin through the upper portion of said member, two adjustable contacts mounted on said movable member near the lower edge thereof, one on each side of said pendulum shaped and positioned for engaging contacts on said pendulum, and two adjustable stops on the lower portion of said mounting, one on each side of said movable member positioned for limiting the arc of swing of said movable member.

5. A depth-tilt control unit for a torpedo, comprising a first control means mounted on the control unit for controlling a pair of contacts, one contact of the pair of contacts being rigidly attached to said first control means and the other contact being adjustably attached to a second control means, said contacts being for inclusion in the control circuit of the torpedo for closing said control circuit when the torpedo tilts in the downward direction and for opening said control circuit when the torpedo tilts in the upward direction, said second control means being frictionally mounted on said control unit and movable in one direction by said first control means when said pair of contacts close due to the torpedo tilting in the downward direction and movable in the opposite direction by said control means when the torpedo tilts in the upward direction, a third control means mounted on said control unit and compliantly coupled to said first control means for altering the movement of said first control means dependent upon the amount of departure of the torpedo from preassigned depth, and a fourth control means mounted on said control unit for counterbalancing the effect upon said third control means of pressure change within the torpedo.

References Cited in the file of this patent
UNITED STATES PATENTS

| | | |
|---|---|---|
| 952,452 | Leon | Mar. 22, 1910 |
| 1,033,810 | Leavitt | July 30, 1912 |
| 1,080,116 | Leavitt | Dec. 2, 1913 |
| 1,378,291 | Sperry | May 17, 1921 |
| 1,432,744 | Dieter | Oct. 24, 1922 |
| 1,659,653 | Hammond et al. | Feb. 21, 1928 |
| 2,414,449 | Chapin | Jan. 21, 1947 |
| 2,427,735 | Naymik | Sept. 23, 1947 |
| 2,538,156 | Keto | Jan. 16, 1951 |